United States Patent
Bleier

(10) Patent No.: US 8,060,432 B2
(45) Date of Patent: Nov. 15, 2011

(54) CENSUS INVESTING AND INDICES

(76) Inventor: Thomas Edward Bleier, Watertown, MA (US)

( * ) Notice: Subject to any disclaimer, the term of this patent is extended or adjusted under 35 U.S.C. 154(b) by 0 days.

(21) Appl. No.: 12/986,034

(22) Filed: Jan. 6, 2011

(65) Prior Publication Data

US 2011/0106728 A1     May 5, 2011

Related U.S. Application Data

(62) Division of application No. 11/765,984, filed on Jun. 20, 2007, now Pat. No. 7,895,110.

(60) Provisional application No. 60/832,283, filed on Jul. 21, 2006.

(51) Int. Cl.
*G06Q 40/00* (2006.01)

(52) U.S. Cl. ................................ 705/36 R

(58) Field of Classification Search ............... 705/36 R
See application file for complete search history.

(56) References Cited

U.S. PATENT DOCUMENTS

| 7,206,760 | B1 | 4/2007 | Carey et al. |
| 7,366,692 | B2* | 4/2008 | Alcaly et al. ................ 705/37 |
| 7,421,407 | B2 | 9/2008 | Long, III et al. |
| 7,558,751 | B2* | 7/2009 | Sauter et al. ............ 705/36 R |
| 2001/0034695 | A1 | 10/2001 | Wilkinson |
| 2005/0137963 | A1* | 6/2005 | Ricketts et al. ............ 705/37 |
| 2005/0216384 | A1 | 9/2005 | Partlow et al. |

\* cited by examiner

*Primary Examiner* — Lindsay M Maguire
*Assistant Examiner* — Jessica Lemieux
(74) *Attorney, Agent, or Firm* — Reed Smith LLP

(57) ABSTRACT

An investment index is generated by selecting a predetermined number of geographic regions having the highest ranked projected population growth and selecting a predetermined number of companies that have at least a predetermined percentage of the company's revenue derived from at least one or a combination of the selected number of geographic regions. The stock prices of the selected companies are then weighted.

34 Claims, 1 Drawing Sheet

CENSUS INVESTING AND INDICES

CROSS-REFERENCE TO RELATED APPLICATION

This is a divisional application of U.S. patent application Ser. No. 11/765,984 filed Jun. 20, 2007, which claims the benefit under 35 U.S.C. §119(e) of the earlier filing date of U.S. Provisional Application Ser. No. 60/832,283 filed on Jul. 21, 2006, which are hereby incorporated herein by reference.

FIELD OF INVENTION

The present invention relates to investing and investment indices.

BACKGROUND OF THE INVENTION

In finance, an index is a numerical value representing the performance of a selected financial group. Indices, for example, are used to represent the changes in the price of securities of a group of stocks having a common characteristic. Examples of indices that are used to gauge the performance of stocks and other securities in the United States include the Dow Jones Industrial Average, the National Association of Securities Dealers Automated Quotations (NASDAQ) Composite Index, Standard and Poor's (S&P) 500 and S&P Mid-Cap and S&P Small-Cap. Currently, there are no existing indices that use projected population growth as the basis for a stock's inclusion within an index.

SUMMARY OF THE INVENTION

According to a preferred embodiment of the present invention, population data is used to create a rule to sort all stocks publicly traded on the various stock exchanges. This rule allows the screening of companies based on the percentage of a company's revenue derived from a geographic region included in the top regions having the largest projected population growth as indicated by the most recent census. In a preferred embodiment of the present invention, the geographic regions are states located in the United States of America. The geographic regions could also include other countries; or states, provinces and territories in those countries.

According to a preferred embodiment of the present invention, the ten states, for example, having the largest projected population growth as indicated by the most recent United States Government Census are selected. According to the United States Government Census Projection Data, updated in April 2005, the United States population will grow by 82,000,000 people from 2000-2030. The top three states in population growth, Florida, Texas and California, will account for 46% of this growth. The top ten states, (Florida, Texas, California, Georgia, Nevada, Arizona, North Carolina, Washington, Virginia and Maryland), will account for 74% of this growth or 61 million people.

An investment index is generated by selecting a predetermined number of geographic regions having the highest ranked projected population growth and selecting a predetermined number of companies that have at least a predetermined percentage of the company's revenue derived from at least one or a combination of the selected number of geographic regions. The stock prices of the selected companies are then weighted.

Census investing provides for screening investments based on the amount of revenue a company derives from a geographic region having a large projected population growth. This screening method provides for investing in companies from geographic regions where the populations are growing.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE PREFERRED EMBODIMENTS

Figure 1:
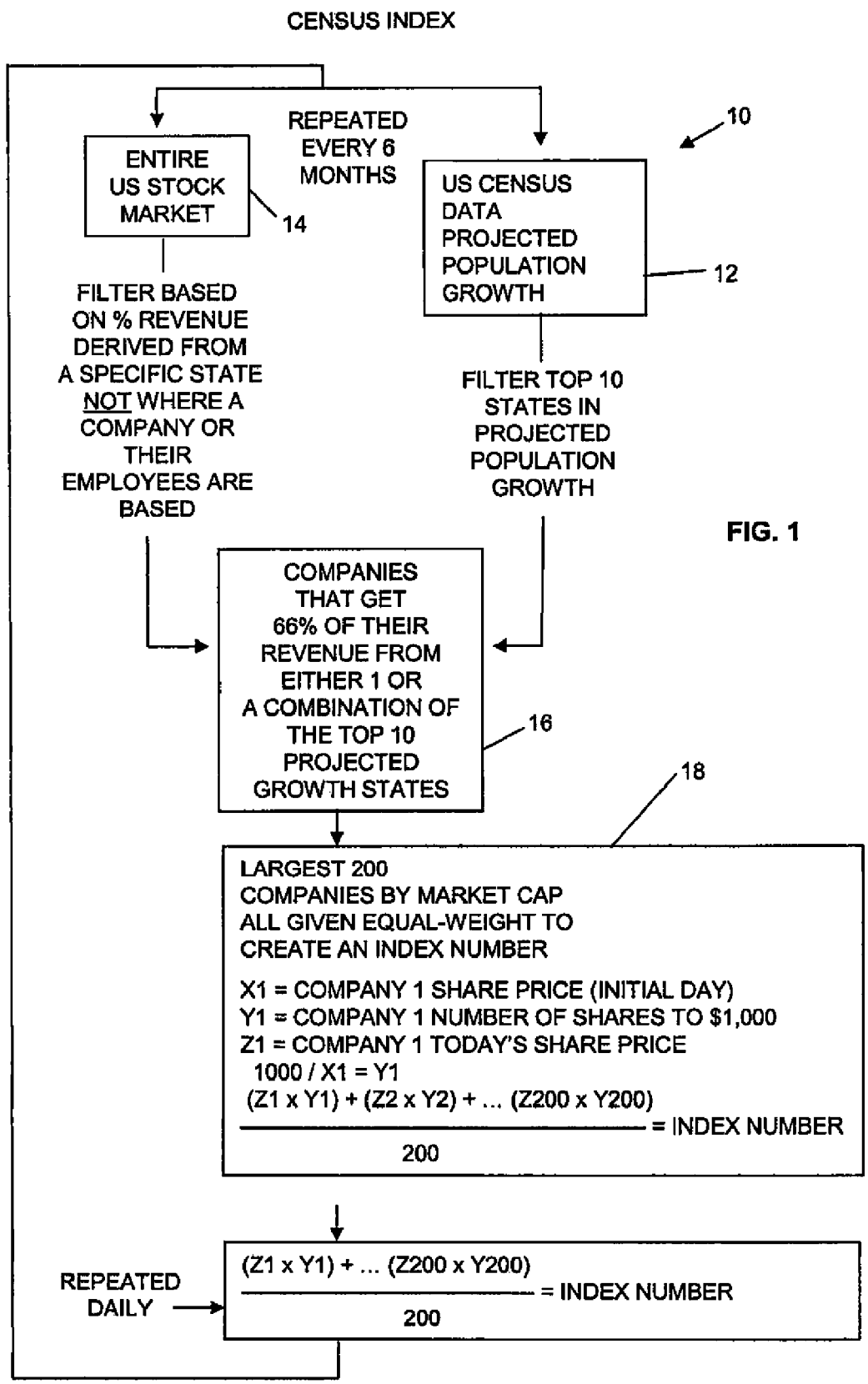
FIG. 1 is a flow diagram showing the process for calculating the census index according to the present invention.

It is to be understood that the FIGURE and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawing.

FIG. 1 is a flow diagram 10 illustrating the process of determining the census index according to a preferred embodiment of the present invention. In this embodiment, the geographic regions are states. The ten states in the United States of America having the largest projected population growth based on the latest United States Government Census Projection Data are determined (step 12). These states are referred to herein as the "census states".

The states from which publicly traded stocks derive their revenue are determined (step 14). The state from which revenue is derived is not necessarily the state in which a company or its employees are based.

Publicly traded stocks of companies having a revenue filter percentage of 66% of their revenue derived from one or a combination of census states are determined (step 18).

The largest 200 companies by market capitalization are determined and given equal weight to determine a census index number (step 18). The census index using equal weighting is determined as follows wherein:

$X_1$=company 1 share price (initial day)
$Y_1$=company 1 number of shares to $1000
$Z_1$=company 1 today's share price $$1000/X_1 = Y_1$$

$$[(Z_1 * Y_1) + (Z_2 * Y_2) + \ldots (Z_{200} * Y_{200})]/200 = \text{Index Number}$$

The calculation for determining the index number is repeated daily. The determination of which companies derive 66% of their revenue from a census state is repeated periodically, preferably every sixth month, but may be repeated every one to twelve months.

As will be appreciated by those of skill in the art, the revenue filter percentage of 66% is an illustrative example. The preferred range may be from a majority of the derived revenue, specifically from approximately 50.1% to 100%. Likewise the number of companies has also been given by way of example only. Alternatively, the number of companies may be from approximately 10 to 1000, or may include the entire list of companies meeting the criteria. The preferred number of states or geographic regions is 10 but may be in the range of approximately 1 to 15. Alternatively, the index may be market capitalization weighted, industry weighted, population weighted, population growth weighted or weighted based on types of companies (i.e. growth companies get more weight or small caps get more weight). These methods of weighting can also be combined, such as, market capitalization-weighted, with an additional weighting/multiplier based on population growth from where the revenue is derived. The present invention is also not limited to sorting all publicly treaded stocks, but could provide for the exclusion of certain categories, such as penny stocks or companies under a certain market cap size if desired.

The census index using alternative weighting methods is determined as follows wherein:

Market Capitalization Weighting:

$X_1$=Company 1 share price daily change $Y_1$=Company 1 market-capitalization (initial day or re-calculation day)

TOTCAP=The total market capitalization of all companies selected for the index $P_1$ (market cap multiplier for Company 1)=$Y_1$/TOTCAP $X_Z$=Share price daily change of the last company in the index $P_Z$=Market Cap multiplier of the last company in the index Initial Starting Index Number=100

$$(X_1*P_1)+(X_2*P_2)+\ldots+(X_Z*P_Z)=\text{Index Number}$$

Industry Weighted:

In industry weighting, it is possible to minimize the influence of a select industry. For example, if 80 banks are in the index of 200 companies, but it is desired that banks have a maximum influence on the index of 25% even though banks represent 40% of the number of companies, this type of weighting would be utilized.

$X_1$=Company 1 share price daily change $P_1$=Industry multiplier for Company 1. $P_1$ can be determined several ways, once the desired percentage for the industry that contains a certain stock is determined. Two examples are: $P_1$=Desired Percentage of Index/Number of stocks in that industry or $P_1$=Desired Percentage of Index*(Market-Cap of Stock 1/Total Market-Cap of stocks in that industry)

$X_Z$=Share price daily change of the last company in the index $P_Z$=Industry multiplier of the last company in the index Initial Starting Index Number=100

$$(X_1*P_1)+(X_2*P_2)+\ldots+(X_Z*P_Z)=\text{Index Number}$$

Population Weighted:

$X_1$=Company 1 share price daily change

TOTPOP=The total population of all the states within the index

STPOP=Total population in a state $P_{ST}$ (state multiplier unique for each state in index)=STPOP/TOTPOP $P_{ST1}$ (company 1 multiplier)=($P_{ST}$ (from State 1)*(% Revenue of company 1 from State 1))+($P_{ST}$ (from State 2)*(% Revenue of company 1 from State 2)+...+($P_{ST}$ (from State 10)*(% Revenue of company 1 from State 10)

$X_z$=Share price daily change of the last company in the index $P_{STZ}$=State multiplier of the last company in the index Initial Starting Index Number=100

$$(X_1*P_{ST1})+(X_2*P_{ST2})+\ldots+(X_Z*P_{STZ})=\text{Index Number}$$

Population Growth Weighted:

$X_1$=Company 1 share price daily change

TOTPOPGR=The total population growth of all the states within the index

STPOPGR=Total population growth in a state $P_{ST}$ (state multiplier unique for each state in index)=STPOPGR/TOTPOPGR $P_{ST1}$ (company 1 multiplier)=($P_{ST}$ (from State 1)*(% Revenue of company 1 from State 1))+($P_{ST}$ (from State 2)*(% Revenue of company 1 from State 2)+...+($P_{ST}$ (from State 10)*(% Revenue of company 1 from State 10)

$X_Z$=Share price daily change of the last company in the index $P_{STZ}$=State multiplier of the last company in the index Initial Starting Index Number=100

$$(X_1*P_{ST1})+(X_2*P_{ST2})+\ldots+(X_Z*P_{STZ})=\text{Index Number}$$

Stock Type Weighted:

In stock type weighting, it is possible to minimize the influence of a select type of stock. Stock types include, but are not limited to Large-Cap, Mid-Cap, Small Cap, Growth and or Value. For example, if 100 Mid-Cap stocks are in the index of 200 companies, but it is desired that Mid-Cap stocks have a maximum influence on the index of 25% even though they represent 50% of the number of companies, this weighting would be utilized.

$X_1$=Company 1 share price daily change $P_1$=Stock type multiplier for Company 1

$P_1$ can be determined several ways, once the desired percentage for the industry that contains a certain stock is determined. Two examples are: $P_1$=Desired Percentage of Index/Number of stocks in that stock type or P1=Desired Percentage of Index*(Market-Cap of Stock 1/Total Market-Cap of stocks in that stock type)

$X_Z$=Share price daily change of the last company in the index $P_z$=Industry multiplier of the last company in the index Initial Starting Index Number=100

In the Final Equation:

$$(X_1*P_1)+(X_2*P_2)+\ldots+(X_Z*P_Z)=\text{Index Number}$$

Combined Weighted:

Can be more than 2 variables.

$X_1$=Company 1 share price daily change $P_{STA1}$=Company 1 multiplier from market capitalization or another metric $P_{STB1}$=Company 1 multiplier from market capitalization or another metric different than $P_{STA1}$ $P_{ST1}$ (company 1 multiplier)=$P_{STA1}*P_{STB1}$ $X_z$=Share price daily change of the last company in the index $P_{STZ}$=Company multiplier of the last company in the index $$(X_1*P_{ST1})+(X_2*P_{ST2})+\ldots+(X_Z*P_{STZ})=\text{Index Number}$$

The present invention also contemplates the index being derived from both foreign and/or domestic stocks. The present invention is not limited to U.S. states having the highest projected population growth, but also provides for other geographic regions as well. For example, other geographic regions could include other countries; or states, provinces and territories in those countries. The geographic regions having the highest projected population growth would be considered to be the census regions from which companies having at least a predetermined percentage of the company's revenue are derived.

The census investing process of the present invention can be applied in a variety of industries. One embodiment of the present invention provides for investing in public utilities. An electric company typically has its rates regulated by the state in which it operates. Therefore, in order to significantly increase its revenue, more people requiring electricity are needed. A person's yearly electricity usage does not typically fluctuate greatly, so it may be difficult for an electric company in a state having a declining population to increase its revenue. Conversely, an electric company in a state with a growing population should be able to successfully grow its revenues. As an example, the census index of utilities ("census utilities index") which obtain 66% or greater of their revenue from the census states was compared with the Dow Jones Utility Index rose 19.06% from Jul. 15, 2001-Jul. 15, 2006. The Census Utilities Index rose 64.45% during the same period. This is a 238.14% greater return.

In retail banking, customer acquisition costs are typically higher in an area with very little population growth than an area with large population growth. Customer acquisition costs have a direct impact on margins and profitability and thus stock price. As an example, the census index of banks ("census bank index") which obtain 66% or greater of their revenue from the census states was compared with PHLX/KBW Bank Index over the same period of time. The PHLX/KBW Bank Index rose 18.57% from Jul. 15, 2001-Jul. 15, 2006, while the census bank index gained 196.61% over the same period. A 958.75% better return. Another example shows Real Estate Investment Trusts (REITs) have a similar correlation because in areas with growing population the rents can be raised faster, producing more revenue, than in an area of the country where population is not growing fast and demand for space is weaker. During the same 5 year period, as the bank index example, the Morgan Stanley REIT index grew 141.06% while the Census REIT Index grew 159.69%.

Analyzing the entire US stock market through Census Investing and creating an index as discussed above, The Census Index, of all US publicly traded companies from Jul. 15, 2001-Jul. 15, 2006 that derive 66% of their revenue from any combination of these 10 census states produced an index that significantly outperformed the overall market.

Data Dates Jul. 15, 2001-Jul. 15, 2006

| Index | Total Return |
| --- | --- |
| Census Index | 180.95% |
| NASDAQ Composite | −2.3% |
| S&P 500 | 1.7% |
| Dow Jones | 1.9% |
| DJ Wilshire 5000 | 10.23% |
| Russell 2000 | 38.83% |
| S&P Mid-Cap 400 | 42.79% |
| S&P Small-Cap 600 | 56.75% |

According to one embodiment of the present invention, the census index is used to produce a public mutual fund. The fund includes the largest 200 companies by market capitalization, which meet the 66% revenue criteria from the census states. This fund is preferably equally weighted and uses the S&P 500 as its benchmark.

According to the census index process of the present invention, the present invention also contemplates the following funds:
Census Index Utility Fund
Census Index REIT Fund
Census Index Bank Fund
Census Index Financial Fund
Census Index Construction Fund
Census Index Micro-Cap Fund
Census Index "State Specific" Fund The present invention further contemplates the use of census indexing in other industries such as retail or transportation. The present invention further contemplates other types of funds such as Actively Managed Census Funds, Census Investing Europe/Emerging Markets/World Funds, Exchange Traded Funds—ETFs, Closed-End Funds.

The present invention may be implemented using hardware, software or a combination thereof and may be implemented in one or more computer systems or other processing systems. If computer implemented, the computer performs the steps listed above. It should be apparent to one of skill in the art how to implement the present invention using computer systems and/or architectures. A computer system performing the method of the present invention would preferably include a processor and a memory for storing processing instructions for controlling the processor. The index may be calculated using the computer system and then be generated on an electronic or hard copy index report. The present invention also provides a computer-readable medium bearing a computer program containing instruction steps such that upon installation of said computer program in a general purpose computer the method of the present invention is performed.

Nothing in the above description is meant to limit the present invention to any specific steps. Alternative steps within the scope of the present invention will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the invention. Accordingly, it is understood that the drawings and the descriptions herein are proffered only to facilitate comprehension of the invention and should not be construed to limit the scope thereof.

What is claimed is:

1. A system for generating an investment index comprising a processor; and a memory for storing processing instructions for controlling the processor, the processor operative with the processing instructions of:
selecting a predetermined number of geographic regions having the highest ranked projected population growth;
selecting a predetermined number of companies that have at least a predetermined percentage of the company's revenue derived from at least one or a combination of the selected number of geographic regions wherein
Z=the predetermined number of companies;
weighting stock prices of the selected companies wherein
P=a weighting multiplier, and
$X_n$=company n share price daily change;
calculating the investment index as a function of $X_n$, P and Z; and
outputting the investment index from the processor.

2. The system of claim 1, wherein the select number of geographic regions is between 1 and 15.

3. The system of claim 2, wherein the select number of geographic regions is 10.

4. The system of claim 1, wherein the predetermined number of companies is between 10 and all companies having the predetermined percentage of the company's revenue derived from at least one or a combination of the predetermined number of geographic regions having highest projected population growth.

5. The system of claim 4, wherein the predetermined number of companies is a predetermined number is between 10 and 1000.

6. The system of claim 5, wherein the predetermined number of companies is 200.

7. The system of claim 1, wherein the predetermined percentage of the company's revenue is between approximately 50.1% and 100%.

8. The system of claim 7, wherein the predetermined percentage of the company's revenue is 66%.

9. The system of claim 1, wherein the stock prices are equally weighted.

10. The system of claim 1, wherein the stock prices are market weighted.

11. The system of claim 1, wherein the stock prices are industry weighted.

12. The system of claim 1, wherein the stock prices are population weighted.

13. The system of claim 1, wherein the stock prices are population growth weighted.

14. The system of claim 1, wherein the stock prices are weighted based on stock type.

15. The system of claim 1, wherein the stock prices are weighted based on a combination of two or more selected from the group consisting equally weighted, market weighted, industry weighted, population weighted, population growth weighted, and stock type weighted.

16. The system of claim 1, further comprising the step of generating an index report.

17. A computer-readable medium bearing a computer program containing instruction steps such that upon installation of said computer program in a general purpose computer, the computer performs a method of generating an investment index comprising the operations of:

selecting a predetermined number of geographic regions having the highest ranked projected population growth;

selecting a predetermined number of companies that have at least a predetermined percentage of the company's revenue derived from at least one or a combination of the selected number of geographic regions wherein Z=the predetermined number of companies;

weighting stock prices of the selected companies wherein

P=a weighting multiplier, and $X_n$=company n share price daily change;

calculating the investment index as a function of $X_n$, P and Z; and outputting the investment index from the processor.

18. The medium of claim 17, wherein the select number of geographic regions is between 1 and 15.

19. The medium of claim 17, wherein the select number of geographic regions is 10.

20. The medium of claim 17, wherein the predetermined number of companies is between 10 and all companies having the predetermined percentage of the company's revenue derived from at least one or a combination of the predetermined number of geographic regions having highest projected population growth.

21. The system of claim 20, wherein the predetermined number of companies is a predetermined number is between 10 and 1000.

22. The medium of claim 21, wherein the predetermined number of companies is 200.

23. The medium of claim 17, wherein the predetermined percentage of the company's revenue is between approximately 50.1% and 100%.

24. The medium of claim 23, wherein the predetermined percentage of the company's revenue is 66%.

25. The medium of claim 17, wherein the stock prices are equally weighted.

26. The medium of claim 17, wherein the stock prices are market weighted.

27. The medium of claim 17, wherein the stock prices are industry weighted.

28. The medium of claim 17, wherein the stock prices are population weighted.

29. The medium of claim 17, wherein the stock prices are population growth weighted.

30. The medium of claim 17, wherein the stock prices are weighted based on stock type.

31. The medium of claim 17, wherein the stock prices are weighted based on a combination of two or more selected from the group consisting equally weighted, market weighted, industry weighted, population weighted, population growth weighted, and stock type weighted.

32. The medium of claim 17, further comprising the step of generating an index report.

33. The medium of claim 17, wherein the geographic regions are states.

34. The system of claim 17, wherein the geographic regions are states.

* * * * *